Nov. 17, 1942.   C. S. GODDIN, JR   2,302,209
CATALYTIC CONVERSION SYSTEM
Filed Dec. 16, 1940
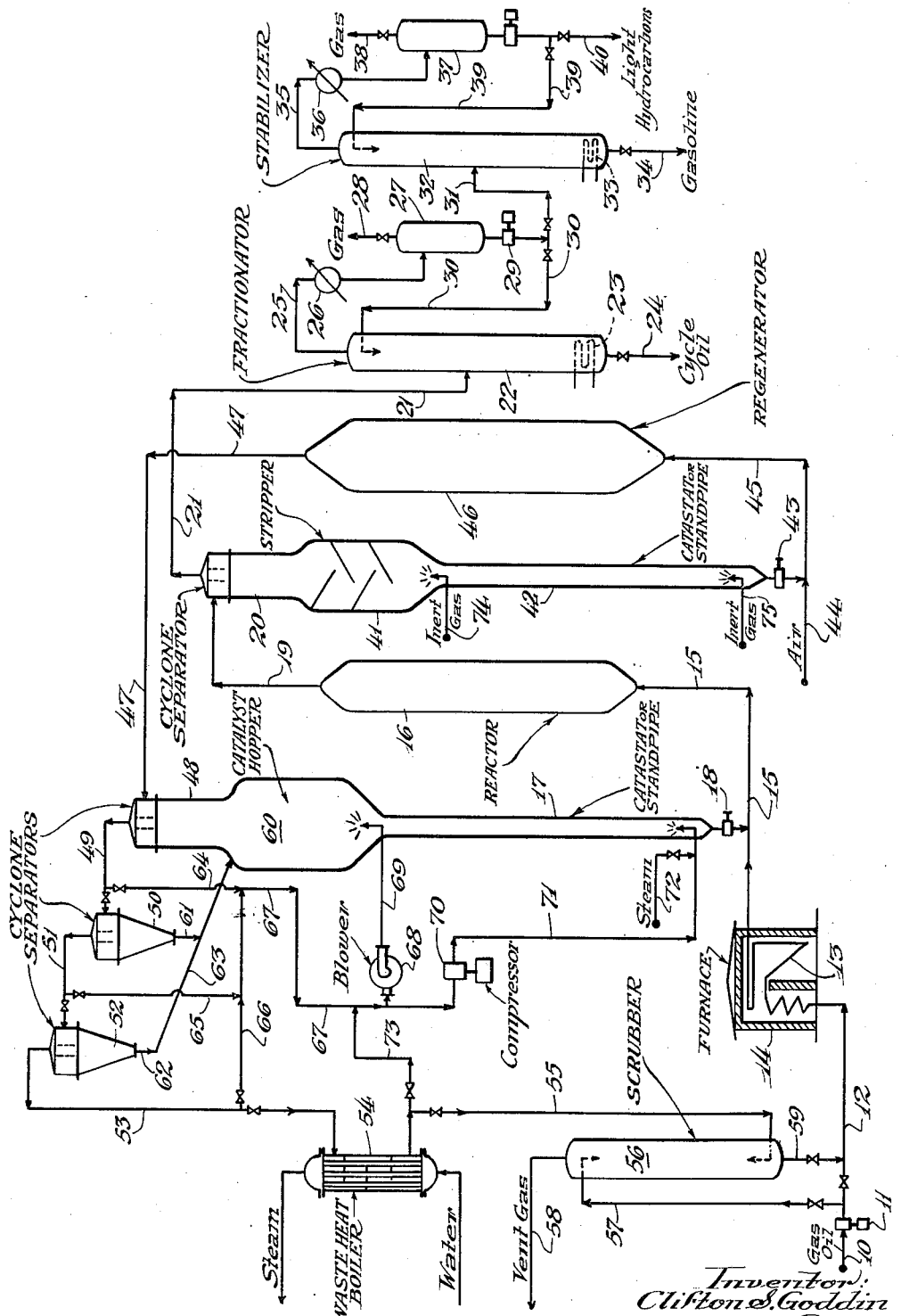
Inventor
Clifton S. Goddin
By Donald C. Payne
Attorney Patented Nov. 17, 1942

2,302,209

UNITED STATES PATENT OFFICE 2,302,209

CATALYTIC CONVERSION SYSTEM

Clifton S. Goddin, Jr., Whiting, Ind., assignor to Standard Oil Company, Chicago, Ill., a corporation of Indiana Application December 16, 1940, Serial No. 370,234

12 Claims. (Cl. 196—52)

This invention relates to a catalytic conversion system and it pertains more particularly to a system for the catalytic production of high quality motor fuel.

In catalytic hydrocarbon conversion processes, such as cracking, hydrogenation, dehydrogenation, aromatization, alkylation, isoforming, reforming, etc. the endothermic reaction and exothermic regeneration may be effected while the catalyst is suspended in reacting vapors and regeneration gases respectively. In such systems the required pressure differentials are obtained by means of a fluid head of dense aerated catalyst in a standpipe, which in this system is called a catastat. Above the catastat is an enlarged catalyst hopper which may have a cross-sectional area ten or twenty times that of the standpipe. A large amount of aerating gas is required in the hopper because of this large cross-sectional area. My invention relates particularly to an improved method and means for aerating such catalyst hoppers and catastats.

An object of my invention is to avoid or minimize cooling of catalyst in catalyst hoppers and catastats and to utilize hot gases produced in the system for aerating the catalyst therein. My object is to avoid the necessity of preheating inert aerating gases such as steam to temperatures of the order of 800 to 950° F. and to avoid the cooling of catalyst which would occur if such gases were used without preheating.

A further object is to reduce the losses of catalyst in hot regeneration gases and to minimize and simplify the problem of recovering the last traces of catalyst from such gases.

A further object is to provide a means for aerating catalyst in hoppers and catastats which will permit a wide variation in operation without throwing other parts of the system out of balance. If external gas such as steam is used for aerating regenerated catalyst the problem of stripping residual catalyst out of hot regeneration exit gases with charging stock becomes more difficult and the loss of charging stock due to vaporization is correspondingly increased due to greater volume of exit gas. An object of my invention is to maintain the amount of exit gas at a minimum.

A further object is to prolong catalyst life and activity by avoiding the use of aerating gases which may have a detrimental effect thereon. For example, many catalysts are deleteriously affected by steam, particularly at the high temperatures at which regenerated catalyst is handled in the regenerating catalyst hopper and catastat.

Other objects will become apparent from the following detailed description read in conjunction with the accompanying drawing which forms a part of this specification and which schematically represents a flow diagram of my improved conversion system as applied to a catalytic cracking process.

I claim no novelty in any catalysts per se and the selection of the catalyst will depend, of course, upon the nature of the conversion process in which it is used. For catalytic cracking I prefer to employ an activated bentonite catalyst or a synthetic catalyst comprising silica gel with alumina, magnesia, or an alumina-zirconia mixture deposited thereon or incorporated therein. The catalyst is preferably in the form of hard, porous particles of about 200 to 400 mesh. The density of the catalyst in compact form may be about 40 to 50 pounds per cubic foot. The catalyst is rendered fluent by aeration to a density of about 20 to 30 pounds per cubic foot, for example, about 25 pounds per cubic foot. With catalyst particles of 200 to 400 mesh size I prefer aeration at a superficial gas velocity of about .1 to .2 foot per second. It should be understood, however, that the linear velocity of the aeration gas will be somewhat dependent upon the catalyst particle size, catalyst density, etc. Generally speaking, the superficial velocity of the areating gas should be about .03 to .6 foot per second.

The catalyst is charged to the system from the base of a column of catalyst in a catastat above which is another column of catalyst in a catalyst hopper. In a commercial installation where the catastat is about 4 feet in diameter the hopper may be about 14 or 15 feet in diameter. A relatively small amount of gas is required for aeration of the catastat but a fairly large amount of gas is required for aeration in the hopper, particularly when it is desired to maintain the areated catalyst in the hopper at a lower density than the aerated catalyst in the catastat.

In practicing my invention I compress a portion of the hot regeneration gases which have been separated from the catalyst at the top of the catalyst hopper and recycle this compressed gas, which may contain a considerable amount of fine catalyst particles, to the base of the catalyst hopper for providing the aeration gas therefor. Thus by recycling a portion of the hot regeneration gas, which contains residual catalyst powder, to aerate the hopper I reduce the total amount of catalyst-bearing gas leaving the system. Catalyst losses are therefore reduced in direct proportion to the extent of use of recycle regeneration gas for this purpose. Only a small amount of compression is required for this purpose and, in fact, an ordinary blower may serve the function of this compressor. A small amount of the hot regeneration gases may be further compressed and introduced at the base of the catastat for obtaining the necessary aeration therein. In this case the column of catalyst includes both the catalyst in the catastat and the catalyst in the hopper. The use of hot catalyst containing regeneration gases for effecting aeration of the hopper and catastat respectively accomplishes four important advantages: (1) it avoids the necessity of employing extraneous aeration gases such as steam which might deleteriously affect the catalyst; (2) it permits the utilization of aeration gas already under pressure, thereby saving the cost of compressing extraneous aeration gas from a lower pressure, for example, atmospheric pressure, to the hopper or catastat pressure; (3) it provides a means for reducing the volume of regeneration gas leaving the system, thereby reducing the size of catalyst recovery equipment and heat recovery equipment, reducing loss of catalyst fines and when exit regeneration gases are scrubbed with incoming feed stock, reducing the vaporization losses of such stock; and (4) it provides a means for controlling the temperature of catalyst in the base of a column which has been subjected to radiant heat losses.

Referring now to the drawing, gas oil charging stock from line 10 is introduced by pump 11 through line 12 to coils 13 of pipe still 14. In the pipe still coils the oil may be vaporized and heated to a temperature of about 800 to 1050° F. at final pressures of about atmospheric to 50 pounds per square inch under which conditions the superheated vapors are passed by transfer line 15 to reactor 16. Catalyst from standpipe 17 is introduced into transfer line 15 or introduced directly into reactor 16 in amounts regulated by slide valve 18.

In a preferred operation I introduce catalyst and oil to reactor 16 in a weight ratio of about 3 parts catalyst to 1 part oil. The reactor is designed to give a vapor velocity of about 2 feet per second, an oil contact time in the reactor of about 10 seconds, and a catalyst contact time in the reactor of about 200 seconds, with an average catalyst density in the reactor of about 13 pounds per cubic foot, an average reaction temperature of about 925° F. and a pressure of about 15 pounds per square inch. It should be understood, however, that my invention is not limited to any particular reaction conditions and that such conditions may vary within a wide range.

The reaction products leave the reactor through line 19 and they remove catalyst from the reactor at the same rate at which it is introduced thereto. The vapor-catalyst stream is introduced into cyclone separator 20. It should be understood that any number of cyclone separators may be employed and that electrical separation, filtration or other mechanical means may be used for removing catalyst from vapors.

The vapors from separator 20 are passed through line 21 to fractionator 22 which is provided with a suitable heating means 23 at its base. Heavier-than-gasoline products are removed through line 24. Gasoline and lighter hydrocarbons are taken overhead through line 25 and cooler 26 and are introduced into receiver 27 from which gases may be vented through line 28. If water is present at this point it may be condensed and separately withdrawn from receiver 27. A part of the hydrocarbon liquids from the base of this receiver may be introduced by pump 29 through line 30 to the top of fractionator 22 to serve as reflux. The rest of the liquid is introduced through line 31 to stabilizer 32 which may be provided with suitable heating means 33 at its base. Stabilized gasoline is withdrawn through line 34.

Overhead from the stabilizer passes through line 35 and cooler 36 to receiver 37 from which gases are vented through line 38. A portion of the liquid may be recycled through line 39 to serve as reflux in the stabilizer and the remaining light hydrocarbon liquids may be withdrawn through line 40 to suitable storage tanks or to other conversion processes.

The catalyst separated from reaction vapors in cyclone separator 20 drops to an enlarged stripping zone 41. From the stripping zone the catalyst is discharged into the top of standpipe or catastat 42 which may be from about 50 to 100 feet high. Catalyst is withdrawn from the base of this catastat in amounts regulated by slide valve 43 and is conveyed by air from line 44 through line 45 to the regenerator 46 which is a large chamber similar in design to reactor 16. The regenerator may be designed for gas velocities of about 1½ feet per second, for a gas contact time of about 13 seconds, and a catalyst contact time of about 250 seconds, with an average catalyst concentration of about 15 pounds per cubic foot, a temperature of about 1025° F. and a pressure of about 15 pounds per square inch.

The hot regeneration gases with suspended catalyst are passed by line 47 to cyclone separator 48 wherein the bulk of the catalyst is removed therefrom. The gases are then passed through line 49 to separator 50 and the gases from separator 50 are introduced through line 51 to separator 52. Here again any number of cyclone separators may be employed in series or other conventional separation means may be used.

The gases from separator 52 are passed through line 53 through a heat exchanger or waste heat boiler 54 and thence through line 55 to the base of absorber column 56. A portion of the fresh feed may be introduced through line 57 to the top of this column and passed countercurrent to the gases through the column for picking up the last traces of catalyst and for absorbing heat from the regeneration gases. The cooled, catalyst-free gases are vented through line 58 and the warmed feed stock containing recovered catalyst is returned to line 12 through line 59.

Catalyst from separator 48 passes to hopper 60—in fact the separator may constitute the upper part of the catalyst hopper. From this hopper catalyst is introduced into the top of standpipe or catastat 17. Catalyst from separator 50 is withdrawn through line 61 and catalyst from separator 52 is withdrawn through line 62, catalyst from these sources being returned to hopper 60 through line 63.

Heretofore catalyst hoppers and catastats have been aerated by steam or by extraneous inert gases. In practicing my invention I employ hot regeneration gas for accomplishing this aeration. The hot regeneration gas may be withdrawn from line 49 through line 64, from line 51 through line 65 or from 53 through line 66 to line 67 and compressor or blower 68. The compressed gases from the blower are introduced through line 69 to the base of the catalyst column in hopper 60 for maintaining the desired aeration of catalyst therein. For a hopper 14 feet in diameter about 1850 cubic feet per minute of gas should be so introduced in order to obtain a superficial gas velocity of about .1 to .2 foot per second in the hopper. More or less gas may be recycled depending upon the size and weight of the catalyst particles, the diameter of the hopper and the desired density of catalyst in the hopper.

If the gas in line 49 contains more catalyst than can be handled by blower 68 I may obtain the recycled aerating gas from line 51 through line 65. If this gas contains too much catalyst for the blower I may obtain the recycled aerating gas from line 53 through line 66. It is advantageous to employ a gas containing as much catalyst as can be handled by the blower or compressor since the recycling of this gas to the hopper provides an excellent means for recovering residual catalyst. Separators 50 and 52 may be reduced in size if a large amount of catalyst-containing gases can be recycled through line 64. The recycling of these regeneration gases not only provides a means for recovering residual catalyst particles therefrom, but it provides an excellent means for controlling the temperature at the base of the hopper. Thus, by recycling relatively cool gas from after the waste heat boiler 54 through line 73 some cooling of catalyst in 60 can be realized, or by recycling relatively hot gases from line 49, a high catalyst temperature can be maintained.

A small amount of the recycled gases may be further compressed by compressor 70 and introduced through line 71 at the base of catastat 17 for aerating the column of catalyst therein. Where the hopper is 14 feet in diameter the catastat may be about 4 feet in diameter and only about 150 cubic feet of gas per minute may be sufficient to effect the desired aeration. Here again the amount of recycled gas will be dependent upon the size and weight of catalyst particles, the diameter of the catastat and the desired density of aerated catalyst therein. Since the amount of aeration gas introduced at this point is relatively small and since it may be desirable to remove oxygen from regenerated catalyst before it is discharged from the base of the catastat I may introduce an extraneous inert gas, such as steam, through line 72 for aerating the bottom of the catastat and limit the use of recycled gases to the aeration of the catalyst hopper.

The avoidance of large amounts of extraneous aeration gas is of particular importance when the last traces of regenerated catalyst are recovered by scrubbing regeneration gas with a part or all of the incoming feed stock. The loss of feed stock by vaporization in such a scrubbing step is directly proportional to the amount of gases that must be scrubbed and by avoiding the use of large amounts of extraneous aeration gas in the hopper I reduce the losses of feed stock in the scrubbing step.

Stripper 41 may be an enlarged chamber similar to catalyst hopper 60 but in this chamber it is essential that volatile hydrocarbons be removed from the catalyst before this catalyst is regenerated. I, therefore, prefer to introduce steam through line 74 for effecting the necessary aeration and stripping. Similarly steam may be introduced through line 75 at the base of catastat 42 for effecting the necessary aeration and further stripping. This stripping steam together with recovered hydrocarbon vapors are withdrawn from the top of separator 20 by line 21.

While steam is a preferred stripping fluid it should be understood that other oxygen-free gases may be used. For instance, the tail gases from lines 28 and 38 of the fractionation system may be heated by suitable heat exchanger in line 53 or line 21 and then introduced through lines 74 and 75 for effecting the necessary stripping and aeration.

The entire conversion and regeneration system will, of course, be operated at very high temperatures and all parts of this system will accordingly be well insulated. If, despite such insulation, the heat losses from catastat 17 or 42 warrant the addition of more heat than can be supplied in the aerating gas through line 71 or line 75 I may jacket either one or both of these catastats and pass hot regeneration gases from line 53 through this jacket prior to introducing the regeneration gases to waste heat boiler 54.

While I have described in detail a preferred embodiment of my invention it should be understood that the cracking and regeneration conditions may be varied throughout a relatively wide range and that the invention is equally applicable to other conversion processes. My invention is not limited to any of the specific details hereinabove described since various modifications and equivalents will be apparent to those skilled in the art from the above description.

I claim:

1. In a catalytic hydrocarbon conversion system wherein solid catalyst is circulated in an aerated condition through a closed cycle and wherein a pressure differential is obtained by maintaining a column of dense aerated catalyst, the method of aerating catalyst in said column which comprises separating catalyst from a hot suspending gas containing catalyst fines, introducing separated catalyst into the top of the catalyst column, compressing the hot separated gas, and introducing at least a part of said compressed gas together with the catalyst fines contained therein at the bottom of said column in amount sufficient to maintain the catalyst in said column in liquid-like aerated form.

2. The method of recovering heat and catalyst particles from hot regeneration gases in a powdered catalyst conversion system wherein hot regeneration gases are separated from regenerated catalyst and the regenerated catalyst is then passed through a column subject to heat radiation losses, which method comprises compressing a portion of the hot gases which have been separated from the major part of the catalyst and introducing the hot compressed regeneration gases together with catalyst particles contained therein into a low point in the catalyst column whereby the catalyst in said column is aerated and heated by the compressed gases.

3. In a catalytic conversion system wherein solid catalyst is circulated in an aerated condition through a closed cycle and wherein a pressure differential is obtained by maintaining a column of dense aerated catalyst, the method of aerating catalyst in said column which comprises separating gases containing catalyst fines from catalyst introduced at the top of said column, compressing said gases and introducing at least a part of said compressed gases together with the catalyst fines contained therein at the base of said column.

4. In a hydrocarbon conversion system wherein a hydrocarbon charging stock is heated to substantially reaction temperature and introduced into a reactor containing solid catalyst suspended in reaction vapors, the reaction vapors are continuously separated from suspended catalyst, the suspended catalyst is continuously regenerated while suspended in regeneration gases and the regeneration gases are continuously separated from regenerated catalyst, the method of obtaining a controlled pressure differential which comprises introducing separated catalyst into the top of a column, compressing gases which have been separated from said catalyst and introducing at least a part of said compressed gases into said column at a point near the base thereof in amounts sufficient to maintain the catalyst in said column in a fluent, liquid-like form.

5. In a system wherein catalyst is introduced from the base of an aerated column into a stream of hot hydrocarbon vapors, then passed through a reaction zone, a separation zone, a regeneration zone and a second separation zone the latter being above said catalyst column, the method of aerating catalyst in said column which comprises compressing hot regeneration gases separated from regenerated catalyst and introducing said compressed regeneration gases at a low point in said column in amounts sufficient to maintain the catalyst in fluent, liquid-like aerated form therein.

6. In a catalytic hydrocarbon conversion system wherein a catalyst first passes through a reaction zone while suspended in hydrocarbon vapors and then passes through a regeneration zone while suspended in regeneration gases, wherein the regeneration gases are separated from regenerated catalyst and scrubbed with charging stock for the recovery of heat and residual catalyst particles and wherein regenerated catalyst is introduced into the top of a vertical column for obtaining the pressure differential required for introducing it into a reaction zone, the method of minimizing charging stock losses in the scrubbing step which comprises compressing a part of the regeneration gases which have been freed from the major part of suspended regenerated catalyst and introducing at least a part of said compressed gases at a low point in said catalyst column for obtaining aeration of catalyst in said column.

7. In a catalytic conversion system a catalyst hopper of large cross-sectional area, a catalyst standpipe of small cross-sectional area communicating with the base of said hopper, means at the top of said hopper for separating the bulk of the catalyst from a gas-catalyst stream and for discharging separated catalyst into said hopper, means for compressing a part of the separated gases, means for introducing the compressed gases at the base of said hopper and means for introducing an aerating gas at the base of said standpipe.

8. In a catalytic conversion system comprising a catalyst zone of large cross-sectional area, a gas-catalyst separation zone at the top of said catalyst zone and a catalyst column at the base of said catalyst zone, the method of aerating catalyst which comprises compressing gases from said gas-catalyst separation zone and introducing said compressed gas at the base of said catalyst zone in amounts sufficient to obtain a superficial gas velocity in said catalyst zone of about .1 to .2 foot per second.

9. The method of claim 8 which includes the further step of compressing gas from said gas-catalyst separation zone and introducing said compressed gas at the base of said catalyst column in amounts sufficient to obtain a superficial gas velocity of about .1 to .2 foot per second.

10. In a catalyst conversion system comprising catalyst zone, a gas-catalyst separation zone at the top of said catalyst zone and a catalyst column at the base of said catalyst zone, the method of controlling the temperature of the catalyst in said catalyst zone and said column which method comprises burning carbonaceous material from powdered catalyst solids while said solids are suspended in a gas stream, whereby the temperature of said solids and said gas stream is about 1000 to 1050° F., introducing said stream into said separation zone, introducing hot solids from the separation zone to said catalyst zone and from said catalyst zone to said column and passing at least a part of the separated gas in heat exchange relation with said solids.

11. The method of claim 10 wherein the gases are passed in heat exchange relation with solids in said catalyst zone.

12. The method of claim 10 wherein the gases are passed in heat exchange relation with solids in said column.

CLIFTON S. GODDIN, Jr.